(12) United States Patent
Hua

(10) Patent No.: US 6,285,793 B1
(45) Date of Patent: Sep. 4, 2001

(54) METHOD AND APPARATUS FOR AUTOMATICALLY DETERMINING A QUANTIZATION FACTOR VALUE THAT PRODUCES A DESIRED AVERAGE COMPRESSION RATIO OF AN IMAGE SEQUENCE USING JPEG COMPRESSION

(75) Inventor: Ping Hua, Streamwood, IL (US)

(73) Assignee: Siemens Medical Systems, Inc., Iselin, NJ (US)

( * ) Notice: Subject to any disclaimer, the term of this patent is extended or adjusted under 35 U.S.C. 154(b) by 890 days.

(21) Appl. No.: 08/554,425

(22) Filed: Nov. 6, 1995

(51) Int. Cl.$^7$ ............................... G06K 9/36; G06K 9/46
(52) U.S. Cl. ................... 382/239; 375/240.03; 382/251
(58) Field of Search ..................... 382/239, 250, 382/251; 358/428, 430; 348/405; 375/240.03

(56) References Cited

U.S. PATENT DOCUMENTS

| | | | | |
|---|---|---|---|---|
| 3,908,081 | * | 9/1975 | Greenberg | 178/6.8 |
| 4,922,273 | * | 5/1990 | Yonekawa et al. | 358/429 |
| 5,146,324 | * | 9/1992 | Miller et al. | 358/133 |
| 5,241,383 | * | 8/1993 | Chen et al. | 348/405 |
| 5,327,254 | * | 7/1994 | Daher | 358/426 |
| 5,543,844 | * | 8/1996 | Mita et al. | 348/405 |
| 5,594,598 | * | 1/1997 | Shikakura | 386/109 |

FOREIGN PATENT DOCUMENTS

| | | | |
|---|---|---|---|
| 0 444 918 A2 | 9/1991 | (EP) | H04N/1/41 |
| 0 514 663 A2 | 11/1992 | (EP) | H04N/7/133 |

OTHER PUBLICATIONS

Wallace, The JPEG Still Picture Compression Standard, Feb. 1992, pp. xviii–xxxiv, IEEE.*
Tsai et al., Motion Estimation and Wavelet Transform in Angiogram Video Coding, Nov. 1993, pp. 1121–1125.*
XP 000479218, "A Video Compression Algorithm With Adaptive Bit Allocation and Quantization", Eric Viscito et al., Publication Date: Nov. 11, 1991, SPIE vol. 1605 Visual Communications and Image Processing '91: Visual Communication, pp. 58–72.
XP 000613973, "A Model for JPEG Quantization", B. G. Sherlock et al., 1994 International Symposium on Speech, Image Processing and Neural Networks, Apr. 13–16, 1994, Hong Kong, pp. 176–179.
XP 000613902, "Simulated Annealing Applied to Optimal DCT Quantization", Barry G. Sherlock et al., International Journal of Modern Physics C., vol. 5, No. 2 (1994) pp. 247–250.

* cited by examiner

Primary Examiner—Timothy M. Johnson
(74) Attorney, Agent, or Firm—Mark H. Jay

(57) ABSTRACT

A sequence of angiographic images is made up of frames of data. A sample sequence, made up of a number of such frames, is compressed using a lower value of the quantization factor and the resulting average compression ratio is determined. The same sample sequence is also compressed using a higher value for the quantization factor and another average compression ratio is determined. The value of the quantization factor corresponding to a desired average compression ratio of the entire sequence can then be determined by linear interpolation.

8 Claims, 3 Drawing Sheets

METHOD AND APPARATUS FOR AUTOMATICALLY DETERMINING A QUANTIZATION FACTOR VALUE THAT PRODUCES A DESIRED AVERAGE COMPRESSION RATIO OF AN IMAGE SEQUENCE USING JPEG COMPRESSION

BACKGROUND OF THE INVENTION

The invention relates to angiography, and more particularly relates to method and apparatus used to record angiographic image sequences. In its most immediate sense, the invention relates to lossy JPEG compression of angiographic image sequences such as are generated by, and stored in, angiographic apparatus.

Angiographic apparatus acquires and archives angiographic image sequences, and, advantageously, communicates such image sequences and makes them available over networks. Diagnostic and interventional angiographic procedures produce such vast quantities of data that image compression is required to carry out these functions properly. For example, during embolization of cerebral arteriovenous malfunctions, as much as 2.4 Gb of data may be acquired, at rates exceeding 5 Mb/S. Without compression of image data, the performance of angiographic imaging apparatus would suffer (e.g. storage space would be rapidly depleted and speed of operation would decrease) and the cost of such apparatus would increase. Thus, all angiography apparatus provides for compression of image data. Lossy JPEG compression is one image compression technique that is widely used in such apparatus.

The JPEG algorithm is an image compression algorithm that is defined by the International Organization for Standardization (ISO), the International Telegraph and Telephone Consultative Committee (CCITT) and the International Electrotechnical Commission (IEC). The JPEG algorithm works by dividing up the image into blocks and then transforming each block to the frequency domain using a two-dimensional discrete cosine transform. More specifically, JPEG compression first divides the image into 8 by 8 pixel blocks and then replaces the 64 original pixels with a block of 64 coefficients. The block contains one DC coefficient and 63 AC coefficients; the DC coefficient equals the average value of the 64 pixel block and the 63 AC coefficients express how the image information in the pixel block is distributed in the frequency domain. After the original image has been compressed, it can be reconstructed from the AC and DC coefficients using an inverse discrete cosine transform.

In lossy JPEG image compression, all these coefficients are quantized, i.e. divided by a visibility threshold that degrades their precision. Because the human eye is less sensitive to higher frequencies, the quantization may be coarser at higher frequencies and finer at lower frequencies. By using such a frequency-dependent quantization scheme (known as a quantization table) information that is visually more important is preserved, and information that is visually less important is discarded. It may therefore be understood that selection of the quantization table determines the degree to which image information is compressed, because such selection determines the quantity of information that is discarded.

In lossy JPEG image compression, the image quantization table is generated by multiplying a predetermined table by a scale factor. This scale factor is known as a quantization factor, or Q factor. Consequently, the degree of image compression depends upon the value chosen for the Q factor. The higher the value of the Q factor, the greater the degree of image compression.

Selection of the desired degree of image compression is of great significance to the performance of angiography equipment. If the image compression ratio is too high, important detail may be lost and the medical value of the angiographic image sequences may suffer. If image compression is too low, the equipment will not perform adequately, i.e. will be too slow or will cause overflow and truncation errors. For these reasons, it is advantageous to optimize the degree of image compression, i.e. to so operate the angiography apparatus as to use e.g. an average 12:1 image compression ratio for all incoming image information, and to thereby optimize the tradeoff between image detail and system performance. (It should be noted that the image compression ratio is only meaningful on an average basis; if a sequence of images is compressed on an average 12:1 basis, this means that the entire sequence will be so compressed; the individual images will likely be more or less compressed.)

Unfortunately, such optimization is difficult to do. The JPEG compression algorithm was developed to compress still images rather than image sequences. Different angiographic sequences compress differently even when JPEG-compressed using the same value for the Q factor. In other words, it is impossible to correlate the value of the Q factor and image compression on an a priori basis. This is because the image content of the incoming information is not known in advance. Patient size, organs of interest, collimation setting and acquisition mode (fluoro or cine) all affect this image content. As a result, to arrive at a desired optimal image compression, it is presently necessary to experiment with different values for the Q factor. This is unsatisfactory, because such an approach requires a capable operator and does not permit real time operation.

One object of the invention is to provide angiographic method and apparatus for automatically, i.e. without an operator, determining an appropriate value for the quantization factor Q for a desired average compression ratio C.

Another object of the invention is to provide such method and apparatus that will operate in real time.

Still another object is, in general, to improve on known image compression methods and apparatus of this general type.

SUMMARY OF THE INVENTION

The invention proceeds from the realization that angiographic image sequences fall into a special category. Angiographic image sequences are highly correlated with respect to time. As a result, a sample sequence from an angiographic image sequence can be used to establish, for the angiographic sequence as a whole, a correlation between average compression ratio and Q factor. Furthermore, within a certain domain that includes a predetermined range of values for the quantization factor, the average compression ratio varies linearly with respect to quantization factor. Therefore, by determining the average compression ratio resulting from use of a value for the Q factor at or near one end of the range and the average compression ratio resulting from use of another value for the Q factor at or near the other end of the range, the value of the Q factor corresponding to the desired average compression ratio can be determined by linear interpolation.

While the invention is therefore specifically applicable to angiographic image sequences, the invention also applies to image sequences that have the same temporal correlation and linearity characteristics. Furthermore, the invention encompasses mathematical equivalents; using a variable other than the quantization factor is within the scope of the invention if its relationship with compression ratio can be derived from the relationship between the quantization factor and the compression ratio.

BRIEF DESCRIPTION OF THE DRAWINGS

The invention will be better understood with reference to the following illustrative and non-limiting drawings, in which.

DETAILED DESCRIPTION OF THE PREFERRED EMBODIMENTS

Figure 1:
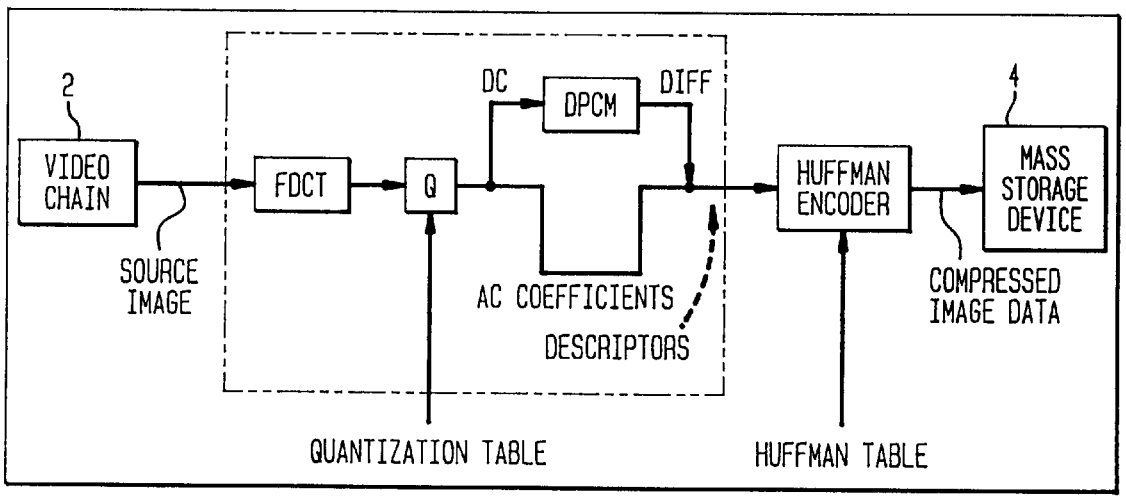
FIG. 1 schematically illustrates how image sequences are JPEG encoded and stored in compressed form.

In a conventional angiographic image acquisition system, angiographic information from a video chain 2 (FIG. 1) is acquired as a sequence of angiographic images made up of frames of image data. Each frame is subjected to forward discrete cosine transformation (FDCT) and quantized (Q) using a quantization table. From this step, AC coefficients and DC coefficients result. The DC coefficients are subjected to differential pulse code modulation (DPCM) to produce difference coefficients (DIFF). The AC coefficients and difference coefficients form descriptors that are Huffman-encoded using a Huffman table, and the Huffman-encoded information is then stored, i.e. written as a file to a mass storage device 4.

Figure 2:
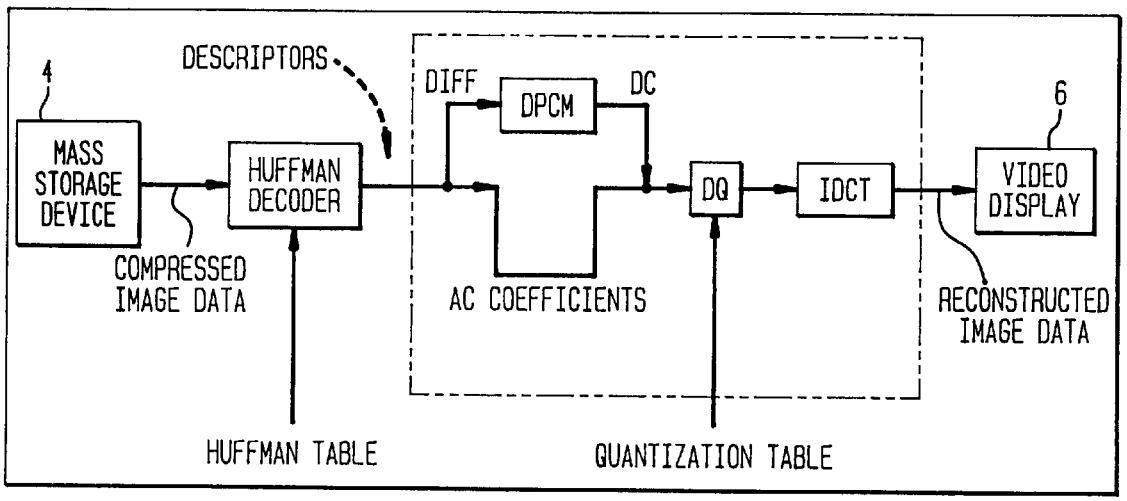
FIG. 2 schematically illustrates how image sequences are JPEG reconstructed and presented for processing and viewing.

When the thus-stored information is retrieved to form an image (see FIG. 2), the mass storage device 4 reads the information and sends it to a Huffman decoder. This decodes the information, producing a series of descriptors made up of AC coefficients and difference coefficients. The difference coefficients are then demodulated in the DPCM element to form DC coefficients. Thereafter, the AC and DC coefficients are dequantized (DQ) and subjected to inverse discrete cosine transformation (IDCT) to form a sequence of angiographic images that can be displayed on a video display 6.

The size of the file on the mass storage device 4 depends not only on the length etc. of the angiographic image sequence, but also upon the compression ratio C achieved during the quantization step. As a practical matter, there is an optimum value for the compression ratio C. When that optimum value is achieved, images stored on the mass storage device 4 will retain all necessary visual detail, thereby retaining the medical usefulness of such images. Furthermore, when that optimum value is achieved, system performance will be adequately fast. For these reasons, it is advantageous to use this optimum value under all circumstances.

However, it is difficult to do this. Although the compression ratio C depends upon the quantization factor Q because the quantization table used is produced by multiplying a predetermined table by the value of the quantization factor Q, the relationship between C and Q cannot be known a priori. This is because different angiographic image sequences will compress differently, depending upon their image contents. Consequently, to achieve an optimum compression value, the operator must experiment with different values for the quantization factor Q. This is time consuming, and prevents real time selection of a proper value for Q.

Figure 3:
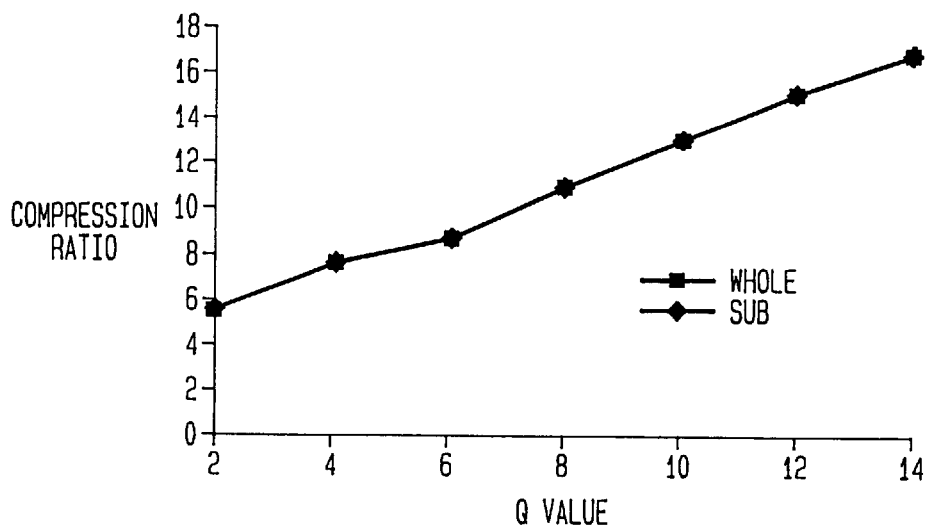
FIG. 3 illustrates the relationship between compression ratio and quantization factor in angiographic image sequences.

The present inventor has demonstrated there is a relationship, in any particular angiographic sequence, between the average compression ratio C and the quantization factor Q when using JPEG compression. This relationship is shown in FIG. 3. As can be seen from FIG. 3, there is a domain in which the relationship between the average compression ratio C and quantization value Q is a linear one. For the particular angiographic sequence that generated FIG. 3, this domain exists between $14 \geq Q \geq 6$ and $17 \geq C \geq 8.5$. As a result, for desired average compression ratios within this domain, the corresponding values of the quantization factor Q can be determined by linear interpolation. For example, if an average compression ratio of 12 is considered to be optimum, the corresponding value of Q will be 10.

Thus, for any particular angiographic sequence, it is only necessary to determine the slope of the FIG. 3 graph within the linear domain. Then, for that particular sequence, the relationship between C and Q will be known and it will be possible to automatically select Q such as to make C equal to the optimum average compression ratio value.

In accordance with the invention, a sample sequence (e.g. one second of video information, i.e. fifteen, thirty or sixty frames, depending upon the manner in which the equipment is adjusted) is taken from the particular angiographic sequence to be compressed. Then, this sample of image information is compressed twice; once using a Q factor value at or near one extreme of the linear domain and a second time using a Q factor value at or near the other extreme of the linear domain. Each time, the average compression ratio C is calculated. The relationships between the Q values on one hand and the C values on the other hand provides the correlation that is necessary to determine the particular value of the quantization factor Q that will produce the desired optimum average compression ratio C. This is because the linear relationship between the average compression ratio and the quantization factor for the sequence as a whole is close to the linear relationship between the average compression ratio and the quantization factor for the sample sequence.

Figure 4:
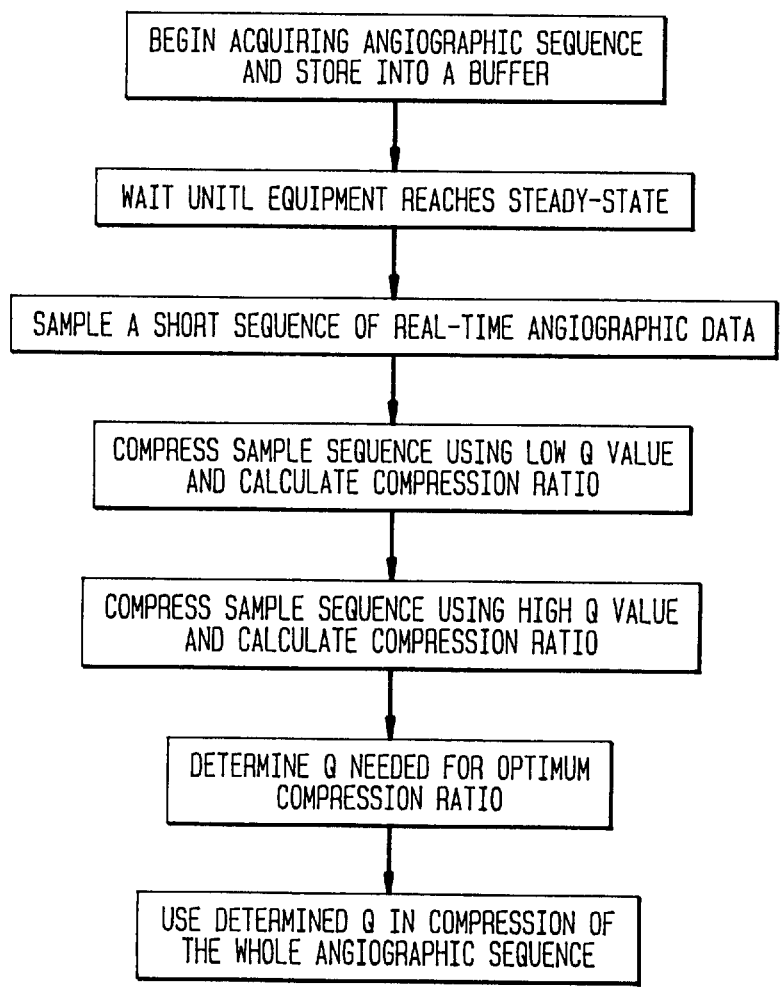
FIG. 4 shows a flow chart for a preferred embodiment of a method in accordance with the invention.

Thus, as shown in FIG. 4, in the preferred embodiment of a method in accordance with the invention, once a series of angiographic images begins, there is a wait until the apparatus stabilizes. This takes approximately one second (typically, thirty frames of video). After this one second wait, the next thirty frames of the video signal are used as a sample sequence. For a quantization factor Q1 having a value at or near 6, the corresponding average compression ratio C1 is calculated for this sample sequence. Then, for another quantization factor Q2 having a value at or near 14, the corresponding average compression ratio C2 is calculated for this sample sequence. (Note: this order may be reversed; Q1 may be at or near 14 and Q2 may be at or near 6. This order is not part of the invention.) Then, using the desired average compression ratio C, the appropriate value for the quantization factor Q can be determined using linear interpolation:

$$Q = Q1 + \frac{(Q2 - Q1)}{(C2 - C1)} * (C - C1)$$

Once the value of the quantization factor Q has been so determined, the quantization factor Q is set to equal the thus-determined value and the entire sequence of images is compressed using that value. By so doing, the average compression ratio will equal the desired value C.

In the preferred embodiment, the sample sequence is chosen to correspond to one second's worth of real-time data. This makes it possible to conveniently calculate the desired value for Q in real time. Although this size of sample sequence is presently preferred, other sizes can be used instead, depending upon the capabilities of the apparatus and the precision with which C must be chosen. In appropriate instances, the sample sequence can be as large as the entire image sequence to be compressed.

Furthermore, in accordance with the preferred embodiment, the same sample sequence is compressed twice using different values for the quantization factor Q. It would alternatively be possible to use two different sample sequences, compressing each sample sequence only once.

In accordance with the preferred embodiment, the relationship between the average compression ratio C and the quantization factor Q is determined. However, other relationships may be used instead. For example, it is not necessary to use the quantization factor Q directly; other variables (such as quality factor) may be used where such variables can be derived from the quantization factor Q. So, too, it is unnecessary to use the average compression ratio in the computation. Other variables, such as average file size, can be used instead where such variables can be derived from the average compression ratio C.

In the preferred embodiment, linear interpolation is carried out using two points, and only in the domain where the relationship between quantization factor Q and average compression ratio C is a strictly linear one. Neither such two point interpolation, nor such a strict linearity, is necessary to the invention. It is possible to use a more-than-two point interpolation scheme instead of a two point interpolation scheme. Furthermore, even in domains wherein the relationship between quantization factor Q and average compression ration C is not strictly linear, linear interpolation may produce adequate results.

Figure 5:
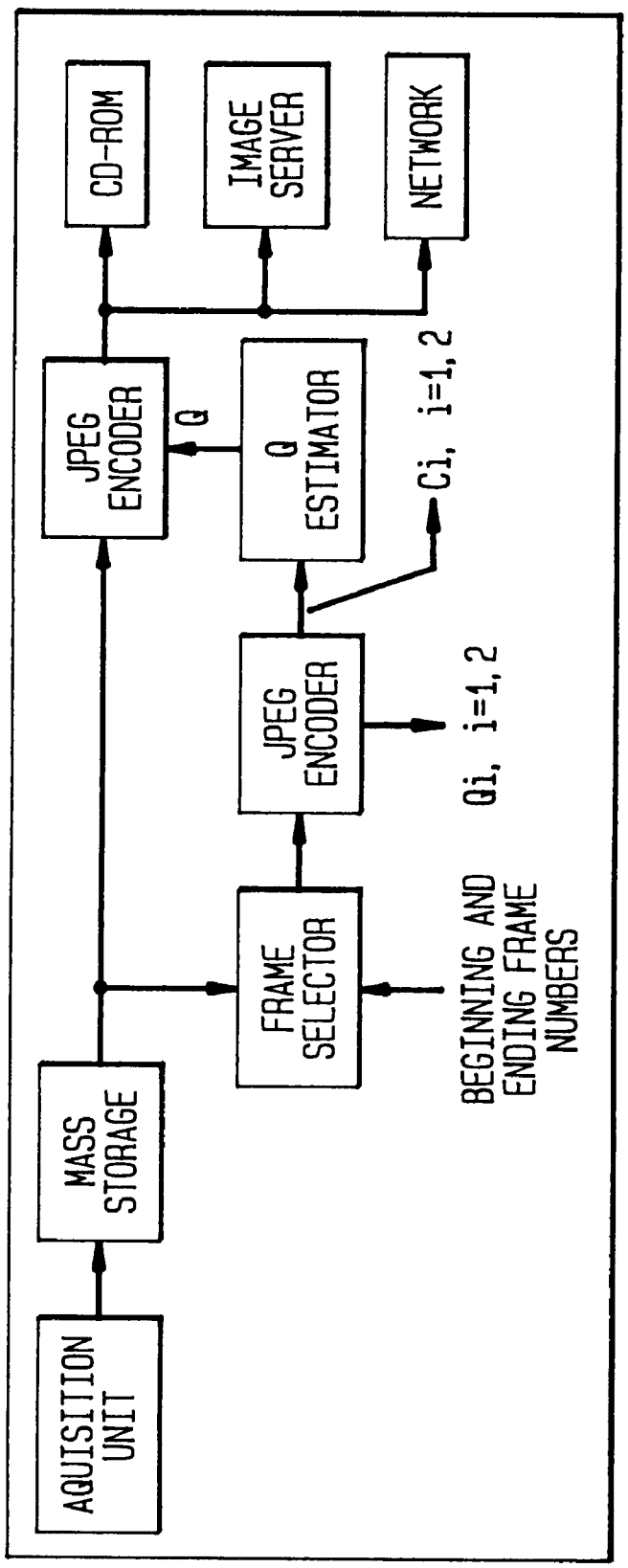
FIG. 5 shows a schematic block diagram of apparatus in accordance with the invention.

FIG. 5 shows a preferred embodiment of apparatus in accordance with the invention. As shown there, an image sequence is acquired by an acquisition unit and stored in a mass storage device (e.g. a hard disk). A sample sequence is selected by a frame selector, which identifies the first and last frames of the sample sequence. The sample sequence is coded twice by the JPEG encoder, once using quantization factor Q1 and the second time using quantization factor Q2. This produces two average compression ratios, C1 and C2. The Q estimator estimates, by linear interpolation, that value of the quantization factor Q which corresponds to the desired value of the average compression ratio. Then, the whole sequence from the mass storage device is compressed in a JPEG encoder, using the thus estimated value for Q. The compressed data may be stored on a CD-ROM, an image server, or output to a network. Although two JPEG encoders are illustrated for clarity, there is actually only one such encoder; it may be implemented in hardware or software.

Although a preferred embodiment has been described above, the scope of the invention is limited only by the following claims.

What is claimed is:

1. A method for automatically determining, for a desired average compression ratio C, and within a predetermined range of quantization values, an appropriate value for a quantization factor Q for use in JPEG compression of image data from a sequence of angiographic images made up of frames of video data, comprising the following steps:
   sampling N frames of video data from the sequence;
   determining, using a low value quantization factor Q that is within said predetermined range and that is assumed to be less than said appropriate value, a lower average compression ratio for the sampled N frames of video data;
   determining, using a high value quantization factor Q that is within said predetermined range and that is assumed to be greater than said appropriate value, a higher average compression ratio for the sampled N frames of video data; and
   determining said appropriate value by linear interpolation.

2. The method of claim 1, wherein N equals the number of frames of video data in one second.

3. The method of claim 1, wherein the low value is at least equal to 6.

4. The method of claim 1, wherein the high value is at most equal to 14.

5. A method for automatically determining, for a desired average compression ratio C, and within a predetermined range of quantization values, an appropriate value for a quantization factor Q for use in JPEG compression of image data of a type wherein, within a predetermined domain that includes said range, average compression ratio varies linearly with respect to quantization factor, comprising the following steps:
   extracting a sample from said image data;
   determining, using a low value quantization factor Q that is within said predetermined range and that is assumed to be less than said appropriate value, a lower average compression ratio for the sample;
   determining, using a high value quantization factor Q that is within said predetermined range and that is assumed to be greater than said appropriate value, a higher average compression ratio for the sample; and
   determining said appropriate value by linear interpolation.

6. The method of claim 5, wherein each of the steps is carried out by a computer-based image acquisition system, and wherein said sampling step is carried out after the image acquisition system has reached steady state.

7. A computer-based angiography system that automatically determines, for a desired average compression ratio C, and within a predetermined range of quantization values, an appropriate value for a quantization factor Q for use in JPEG compression of image data from a sequence of angiographic images made up of frames of video data, comprising the following steps:
   means for sampling N frames of video data from the sequence;
   means for determining, using a low value guantization factor Q that is within said predetermined range and that is assumed to be less than said appropriate value, a lower average compression ratio for the sampled N frames of video data;
   means for determining, using a high value quantization factor Q that is within said predetermined range and that is assumed to be greater than said appropriate value, a higher average compression ratio for the sampled N frames of video data; and
   means for determining said appropriate value by linear interpolation.

8. A method for automatically determining, for a desired average compression ratio C, and within a predetermined range of quantization values, an appropriate value for a parameter for use in JPEG compression of image data of a type wherein, within a predetermined domain that includes said range, average compression ratio varies linearly with respect to said parameter, comprising the following steps:

extracting a sample from said image data;

determining, using a low value of said parameter that is within said predetermined range and that is assumed to be less than said appropriate value, a lower average compression ratio for the sample;

determining, using a high value of said parameter that is within said predetermined range and that is assumed to be greater than said appropriate value, a higher average compression ratio for the sample; and determining said appropriate value by linear interpolation.

* * * * *